(12) United States Patent
Droppo et al.

(10) Patent No.: US 10,558,909 B2
(45) Date of Patent: Feb. 11, 2020

(54) LINEARLY AUGMENTED NEURAL NETWORK

(71) Applicant: Microsoft Technology Licensing, LLC, Redmond, WA (US)

(72) Inventors: James G. Droppo, Carnation, WA (US); Pegah Ghahremani, Baltimore, MD (US); Michael L. Seltzer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1057 days.

(21) Appl. No.: 14/980,976

(22) Filed: Dec. 28, 2015

(65) Prior Publication Data

US 2017/0185887 A1 Jun. 29, 2017

(51) Int. Cl.
*G06N 3/04* (2006.01)
*G06N 3/08* (2006.01)

(52) U.S. Cl.
CPC ........... *G06N 3/0481* (2013.01); *G06N 3/08* (2013.01)

(58) Field of Classification Search
CPC ...... G06N 3/0481; G06N 3/0454; G06N 3/08; G06N 3/02
USPC ...................................................... 706/15, 20
See application file for complete search history.

(56) References Cited

U.S. PATENT DOCUMENTS

| | | | |
|---|---|---|---|
| 8,700,552 B2 | 4/2014 | Yu et al. | |
| 8,918,352 B2 | 12/2014 | Deng et al. | |
| 9,015,092 B2 | 4/2015 | Sinyavskiy et al. | |
| 2014/0067735 A1 | 3/2014 | Yu et al. | |
| 2014/0229158 A1 | 8/2014 | Zweig et al. | |
| 2014/0257803 A1 | 9/2014 | Yu et al. | |
| 2014/0257804 A1 | 9/2014 | Li et al. | |
| 2014/0257805 A1 | 9/2014 | Huang et al. | |
| 2014/0372112 A1 | 12/2014 | Xue et al. | |
| 2015/0149165 A1 | 5/2015 | Saon | |
| 2015/0161522 A1 | 6/2015 | Saon et al. | |
| 2016/0379113 A1* | 12/2016 | Gruenstein | G10L 15/16 706/20 |
| 2017/0185897 A1 | 6/2017 | Droppo et al. | |

OTHER PUBLICATIONS

Kaiming He, Deep Residual Learning for image Recognition, p. 770-778, 2015.*
Ghahremani, et al., "Linearly Augmented Deep Neural Network", In Proceedings of IEEE International Conference on Acoustics, Speech and Signal Processing (ICASSP), Mar. 20, 2016, 7 pages
Smith, Leslie N., "No More Pesky Learning Rate Guessing Games", In Proceedings of the Computer Vision and Pattern Recognition, Jun. 9, 2015. pp, 1-11.
Ranganath, et al., "An Adaptive Learning Rate for Stochastic Variational Inference", In Proceedings of the 30th International Conference on Machine Learning, Jun. 16, 2013, 10 pages.

(Continued)

*Primary Examiner* — William A Jerez Lora
(74) *Attorney, Agent, or Firm* — Christopher J. Volkmann; Kelly, Holt & Christensen, PLLC

(57) ABSTRACT

A neural network is structured to connect the input values of an input set, at each level, to that level's output using a linear bypass connection. The linear bypass connection passes the input values, to the output, without applying a non-linear function to them.

18 Claims, 13 Drawing Sheets

(56) References Cited

OTHER PUBLICATIONS

Schaul, et al., "Adaptive learning rates and parallelization for stochastic, sparse, non-smooth gradients", In Proceedings of the International Conference on Learning Representations, May 2, 2013, pp. 1-10.
Kiros, Ryan., "Training Neural Networks with Stochastic Hessian-Free Optimization", In Proceedings of the International Conference on Learning Representations, May 2, 2013, pp. 1-11.
Guenter, et al., "Stochastic Gradient Descent Algorithm in the Computational Network Toolkit", In Proceedings of the NIPS Workshop on Optimization for Machine Learning, Dec. 2013, pp. 1-5.
Efe, et al., "Stabilizing and Robustifying the Learning Mechanisms of Artificial Neural Networks in Control Engineering Applications", In International Journal of Intelligent Systems, vol. 15, Issue 5, May 2000, pp. 365-388.
Dabney, et al., "Adaptive Step-Size for Online Temporal Difference Learning", In Proceedings of the Twenty-Sixth AAAI Conference on Artificial Intelligence, Jul. 22, 2012, 7 pages.
Romero, et al., "Meta-parameter free unsupervised sparse feature learning", In Proceedings of IEEE Transactions on Pattern Analysis and Machine Intelligence, vol. 37, Issue 8, Aug. 2015, pp. 1-8.
Ioffe, et al., "Batch Normalization: Accelerating Deep Network Training by Reducing Internal Covariate Shift", In Proceedings of the 32nd International Conference on Machine Learning, Jul. 6, 2015, 9 pages.
Plagianakos, et al., "Learning Rate Adaptation in Stochastic Gradient Descent", In Proceedings of Advances in Convex Analysis and Global Optimization, Nov. 24, 2004, pp. 15-26.
Serban, Julian, "Tweaking Hyperparameters to Stabilize Learning Rate", Published date: Apr. 2, 2015 Available at: https://iuserban.wordpress.com/2015/04/02/tweaking-hyperparameters-to-stabalize-learning-rate/.
Xiang-Yu. et al., "A Self-Stabilizing Neural Algorithm for Total Least Squares Filtering", In Proceedings of Neural Processing Letters, vol. 30, Issue 3, Dec. 2009, 2 pages.
George, et al., "Adaptive Stepsizes for Recursive Estimation with Applications in approximate Dynamic Programming", In Journal of Machine Learning, vol. 65, Issue 1, May 17, 2006, pp. 167-198.
Sutskever, et al., "On the Importance of Initialization and Momentum in Deep Learning", In Proceedings of 30th International Conference on Machine Learning, vol. 28, Jun. 16, 2013, pp. 14 pages.
Schaul, et al., "No More Pesky Learning Rates", In Journal of Computing Research Repository, Jun. 2012, 14 pages.
Bottou, Leon, "Large-Scale Machine Learning with Stochastic Gradient Descent", In Proceedings of 19th International Conference on Computational Statistics, Aug. 22, 2010, pp. 1-10.
Robbins, et al., "A Stochastic Approximation Method", In Journal of The Annals of Mathematical Statistics, vol. 22, No. 3, Sep. 1951, pp. 400-407.
Amari, et al., "Adaptive Method of Realizing Natural Gradient Learning for Multilayer Perceptrons", In Journal of Neural Computation, vol. 12, Issue 6, Jun. 2000, pp. 1-15.
Amari, Shun-Ichi, "Differential-Geometrical Methods in Statistics", In Publication of Springer Science & Business Media, Lecture Notes in Statistics, vol. 28, Retrieved on: Sep. 9, 2015, 3 pages.
Lecun, et al., "Efficient BackProp", In Publication of Springer—Neural Networks: Tricks of the Trade, Retrieved on: Sep. 9, 2015, 44 pages.
Glorot, et al., "Understanding the Difficulty of Training Deep Feedforward Neural Networks", In Proceedings of 13th International Conference on Artificial Intelligence and Statistics, vol. 9, May 2010, pp. 249-256.
International Search Report and Written Opinion for International Patent Application No. PCT/US2016/067637, dated Apr. 6, 2017, date of filing: Dec. 20, 2016, 24 pages.

Ghahremani et al., "Self-Stabilized Deep Neural Network", 2016 IEEE International Conference on Acoustics, Speech and Signal Processing (ICASSP), IEEE, Mar. 20, 2016, 5 pages.
Ioffe et al., "Batch Normalization: Accelerating Deep Network Training by Reducing Internal Covariate Shift", Mar. 2, 2015, Retrieved from the Internet: URL:http://arxiv.org/pdf/1502.3167v3.pdf, Retrieved on Apr. 18, 2016, 11 pages.
Chinea, Alejandro, "Understanding the Principles of Recursive Neural Networks: A Generative Approach to Tackle Model Complexity", In Proceedings of 19th International Conference on Artificial Neural Networks, Sep. 15, 2009, 11 pages.
Nielsen, Michael, "Why are Deep Neural Networks hard to Train?", Published on: Aug. 2015 Available at: http://neuralnetworksand-deeplearning.com/chap5.html.
Zhao, et al., "Investigating Online Low-Footprint Speaker Adaptation using Generalized Linear Regression and Click-Through Data", In Proceedings of IEEE International Conference on Acoustics, Speech and Signal Processing, Apr. 19, 2015, pp. 4310-4314.
Huang, et al., "Maximum a Posteriori Adaptation of Network Parameters in Deep Models", In Journal of Computing Research Repository, Mar. 2015, 5 pages.
Raiko, et al., "Deep Learning Made Easier by Linear Transformations in Perceptrons", In Proceedings of Fifteenth International Conference on Artificial Intelligence and Statistics, Apr. 21, 2012, pp. 924-932.
Tang, Yichuan, "Deep Learning using Linear Support Vector Machines", In Proceedings of 30th International Conference on Machine Learning: Workshop on Challenges in Representation Learning, Jun. 16, 2013, 6 pages.
Hinton, et al., "Deep Neural Networks for Acoustic Modeling in Speech Recognition", In Journal of IEEE Signal Processing Magazine, vol. 29, No. 6, Nov. 2012, 27 pages.
Lecun, et al., "Deep Learning", In International Journal of Nature, vol. 521, May 28, 2015, 15 pages.
Huang, et al., "Towards Better Performance with Heterogeneous Training Data in Acoustic Modeling using Deep Neural Networks", In Proceedings of 15th Annual Conference of International Speech Communication Association, Sep. 2014, 5 pages.
Niu, et al., "Acoustic Emotion Recognition using Deep Neural Network", In Proceedings of 9th International Symposium on Chinese Spoken Language Processing, Sep. 12, 2014, pp. 128-132.
Yu, et al., "Exploiting Sparseness in Deep Neural Networks for Large Vocabulary Speech Recognition", In Proceedings of IEEE International Conference on Acoustics, Speech and Signal Processing, Mar. 25, 2012, pp. 4409-4412.
Xue, et al., "Restructuring of Deep Neural Network Acoustic Models with Singular Value Decomposition", In Proceedings of 14th Annual Conference of the International Speech Communication Association, Aug. 25, 2013, pp. 2365-2369.
Bengio, et al., "Representation Learning: A Review and New Perspectives", In Journal of IEEE Transactions on Pattern Analysis and Machine Intelligence, vol. 35, Issue 8, Aug. 2013, pp. 1798-1828.
Bengio, et al., "Greedy Layer-Wise Training of Deep Networks", In Proceedings of the Twenty-First Annual Conference on Neural Information Processing Systems, Dec. 3, 2007, 8 pages.
Lee, et al., "Deeply-Supervised Nets", In Journal of Computing Research Repository, Sep. 2014, pp. 1-10.
Yu, et al., "An Introduction to Computational Networks and the Computational Network Toolkit", In Technical Report MSR-TR-2014-112, Aug. 2014, 189 pages.
Dahl, et al., "Improving Deep Neural Networks for LVCSR using Rectified Linear Units and Dropout", In Proceedings of IEEE International Conference on Acoustics, Speech and Signal Processing, May 26, 2013, 5 pages.
Garofolo, et al., "Darpa Timit Acoustic-Phonetic Continous Speech Corpus CD-Rom. NIST Speech Disc 1-1.1", In Recon Technical Report, Feb. 1993, 85 pages.
Nair, et al., "Rectified Linear Units Improve Restricted Boltzmann Machines", In Proceedings of 27th International Conference on Machine Learning, Jun. 21, 2010, 8 pages.

(56) References Cited

OTHER PUBLICATIONS

Fiscus. et al., "The Rich Transcription 2007 Meeting Recognition Evaluation", In Publication of Springer as Multimodal Technologies for Perception of Humans, Jan. 1, 2008, 18 pages.
Swietojanski, et al., "Hybrid Acoustic Models for Distant and Multichannel Large Vocabulary Speech Recognition", In Proceedings of IEEE Workshop on Automatic Speech Recognition and Understanding, Dec. 8, 2013, 6 pages.
Hinton, et al., "A Fast Learning Algorithm for Deep Belief Nets", In Journal of Neural Computation, vol. 18, Issue 7, Jul. 2006, 16 pages.
Hain, et al., "Transcribing Meetings with the AMIDA Systems", In Journal of IEEE Transactions on Audio, Speech and Language Processing, vol. 20, No. 2, Feb. 2012, pp. 486-498.
Erhan, et al., "Why Does Unsupervised Pre-training Help Deep Learning?", In Journal of Machine Learning Research, vol. 11, Feb. 2010, pp. 625-660.
International Search Report and Written Opinion for International Patent Application No. PCT/US2016/067639, dated Mar. 17, 2017, date of filing: Dec. 20, 2016, 18 pages.
Kaiming He et al.: "Deep Residual Learning for Image Recognition", 2016 IEEE Conference on Computer Vision and Pattern Recognition (CVPR), Dec. 10, 2015, Retrieved from the Internet: URL:https://arxiv.org/abs/1512.03385, Retrieved on Mar. 9, 2017, 12 pages.
Nicol N. Schraudolph: "Centering Neural Network Gradient Factors" In: "Network and Parallel Computing", Jan. 1, 2012, 19 pages.
Schikuta Erich et al.: "N2Sky—Neural Networks as Services in the Clouds", The 2013 International Joint Conference on Neural Networks (IJCNN), IEEE, Aug. 4, 2013, 8 pages.
"Non Final Office Action Issued in U.S. Appl. No. 14/980,820", dated Mar. 1, 2019, 55 Pages.
Devlin et al., "Fast and Robust Neural Network Joint Models for Statistical Machine Translation", In Proceedings of 52nd Annual Meeting of the Association for Computational Linguistics, Jun. 23, 2014, pp. 1370-1380.
"Final Office Action Issued in U.S. Appl. No. 14/980,820", dated Aug. 22, 2019, 51 Pages.
"Advisory Action Issued in U.S. Appl. No. 14/690,820", dated Nov. 13, 2019, 7 Pages.
Li, et al., "The Improved Training Algorithm of Back Propagation Neural Network with Self-adaptive Learning Rate", In Proceedings of International Conference on Computational Intelligence and Natural Computing, Jun. 6, 2009, pp. 73-70.
Xie, et al., "Adaptive Inverse Induction Machine Control Based on Variable Learning Rate BP Algorithm", Proceedings of the IEEE International Conference on Automation and Logistics, Aug. 18, 2007, pp. 2367-2372.

\* cited by examiner

LINEARLY AUGMENTED NEURAL NETWORK

BACKGROUND

Computer systems are currently in wide use. Some such computer systems receive input signals indicative of various patterns, and generate a pattern recognition result indicative of one or more patterns recognized in the input.

By way of example, some computer systems include speech processing systems, such as speech recognition systems, that receive an audio signal and recognize speech in the audio signal. The speech can be transcribed, for instance, into text. Other computer systems include handwriting recognition systems, that receive an input signal indicative of a handwriting character. For instance, the input signal may indicate pixels of a touch sensitive screen that were activated based on a user's touch input on the touch sensitive screen. The input is subjected to handwriting recognition where a character is recognized based on the input. Other computing systems can include, for instance, image recognition systems (such as facial recognition systems, finger print recognition systems, etc.).

Some computing systems that are used in pattern recognition can deploy neural networks (or artificial neural networks). Such networks have an interconnected set of nodes (or neurons) that exchange messages with each other. The connections have numeric weights which indicate the strength of connection between nodes. The weights can be tuned and therefore the neural networks are capable of learning.

During recognition, a set of features (such as a feature vector) is extracted from an input signal representing an input. The features are applied to the neural network to activate a first set of nodes (e.g., an input level) in the neural network. The feature values are weighted and transformed by a function, and then passed to another level in the neural network (which represents another set of nodes). This continues until an output neuron (or node) is activated that corresponds to a pattern (e.g., a speech unit, a handwriting character, etc.) represented in the input signal.

Deep neural networks (DNNs) are neural networks with a relatively large number of levels (or multiple layers of nodes) between the input and output layers. Deep neural networks are thus a powerful tool for modeling complex non-linear relationships. Therefore, they are powerful for performing many character recognition tasks, such as large vocabulary speech recognition. By way of example, some speech recognition systems employ deep neural network acoustic models using millions of parameters. The deeper networks can represent certain function classes better than shallower networks, and the use of deep networks can offer both computational and statistical efficiency for complex tasks.

Training a deep neural network with a large number of layers, however, can be difficult. This is because, during training, the training system attempts to attribute error values to the different parameters in the model using back propagation. This is often done by computing the derivative of the error function with respect to the parameters. Since the activation functions in the neural network often include a compressive non-linear component, this leads to a compression of the error gradient that propagates through that non-linearity. The compression increases with the number of levels, through which the error gradient is propagated, in the neural network. The gradient thus vanishes exponentially with the number of layers it passes through.

To address this gradient vanishing problem, some have attempted to perform unsupervised pre-training to help train deep networks with improved parameter initialization. Others have attempted to change the loss function by introducing a companion objective to the individual hidden layers, in addition to the overall objective at the output layer. Training and evaluating a deep neural network, using these techniques, can consume a great deal of computational overhead, resulting in undesirably high computation costs.

The discussion above is merely provided for general background information and is not intended to be used as an aid in determining the scope of the claimed subject matter.

SUMMARY

A neural network is structured to connect the input values of an input set, at each level, to that level's output using a linear bypass connection. The linear bypass connection passes the input values, to the output, without applying a non-linear function to them.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
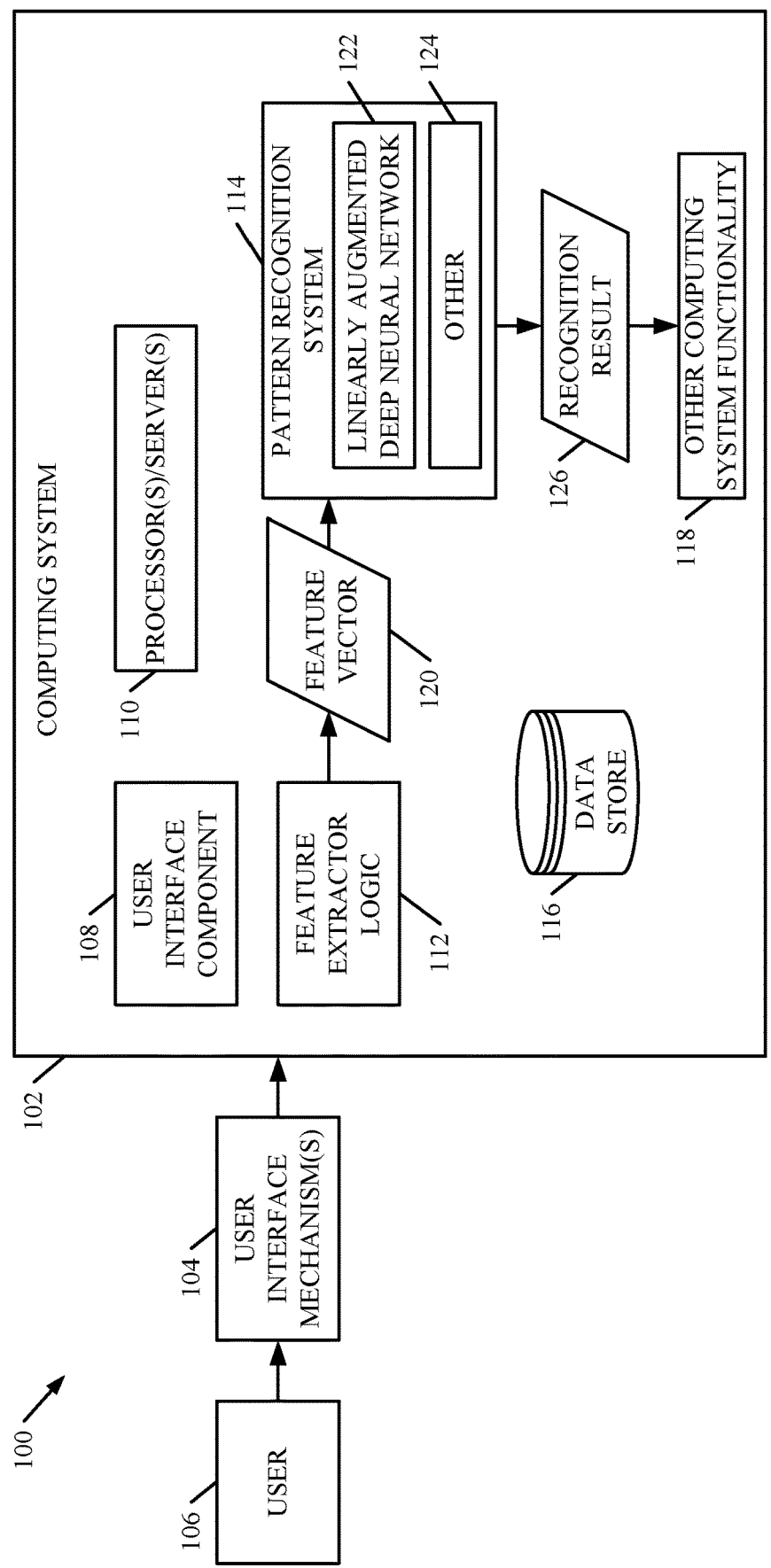
FIG. 1 is a block diagram of one example of a computing system architecture.

FIG. 1 is block diagram of one example of a computing system architecture 100. Architecture 100 illustratively includes computing system 102 and user interface mechanisms 104. User 106 illustratively interacts with user interface mechanisms 104 in order to control and manipulate computing system 102.

Computing system 102, itself, illustratively includes user interface component 108, one or more processors or servers 110, feature extractor logic 112, pattern recognition system 114, data store 116, and other computing system functionality 118. Feature extractor logic 112 illustratively receives an input signal from one or more user interface mechanisms 104. The signal illustratively represents information (such as a pattern) to be recognized by pattern recognition system 114. In one example, feature extractor logic 112 illustratively extracts a set of features (such as feature vector 120) from the input signal. Feature vector 120 is provided to pattern recognition system 114. System 114 illustratively includes linearly augmented deep neural network (LA-DNN) 122, and it can include other items 124. The feature vector 120 is applied to LA-DNN 122, which illustratively generates a set of recognition results 126. Recognition results 126 illustratively identify the pattern represented by the feature vector 120.

As a more concrete example, user interface mechanism 104 can be a microphone that receives an utterance from user 106 and generates a signal indicative of the utterance. Feature extractor logic 112 can be an acoustic feature extractor that extracts the feature vector 120, as a set of acoustic features, and provides it to pattern recognition system 114. The acoustic features are applied to LA-DNN 122 which generates a speech recognition result 126 indicative of the speech represented by the feature vector 120. In that example, other computing system functionality 118 can include a language model, a speech-to-text component that generates a textual output based on the speech recognition result 126, the textual output being indicative of the spoken utterance spoken by user 106, a natural language understanding system, etc.

It will be appreciated, however, that computing system 102 can be a variety of different computing systems. For instance, it can be a handwriting recognition system where user interface mechanism 104 is a touch sensitive screen that generates a signal indicative of a handwriting input provided by user 106, on the touch sensitive screen. In that case, the recognition results 126 may be a letter or other character corresponding to the handwriting input. The system may be an image recognition system (such as a facial recognition system, or another image recognition system) where a user interface mechanism 104 is an image capture device, such as a camera, or another image capture device that generates a signal representative of a captured image. The recognition result 126 may be a facial recognition result that identifies an individual, based upon the pattern recognized in the feature vector generated from the image received. These are examples only.

Before describing the structure of LA-DNN 122 in more detail, a brief overview will first be provided. A conventional deep neural network (DDN) model is a composition of several layers, where each layer includes an affine transformation followed by a non-linear function, as mentioned above. An output unit y in each layer can be described using an input vector x, a weight matrix W, a bias vector b and a non-linear function σ as follows:

$$y = \sigma(Wx+b) \qquad \text{Eq.1}$$

Singular value decomposition (SVD) techniques can be used to decrease model size and computation during decoding. Thus, a DNN can employ SVD-based layers, where the weight matrix in each layer is decomposed into two lower rank matrices with smaller dimensions. Each non-linearity is thus preceded by an affine transformation Ux+b, and followed by a linear transformation V, as follows:

$$y = V\sigma(Ux+b) \qquad \text{Eq. 2}$$

Equation 2 thus uses a non-linear mapping to transform from a continuous vector x to a continuous vector y. If the optimal transformation for each layer contains a linear component, it is difficult for this layer type to learn. Non-linear functions, such as the sigmoid function, would need to allocate many parameters to deconstruct the vector space into overlapping regions, and then rebuild it again.

Therefore, in accordance with one example, LA-DNN 122 is represented by a modified form of Equation 2 above. It connects the input x to the output y using a linear bypass connection. The linear bypass T can be modeled as an identity, diagonal, or full transformation matrix, as follows:

$$y = V\sigma(Ux+b)+Tx \qquad \text{Eq. 3}$$

Figure 2:
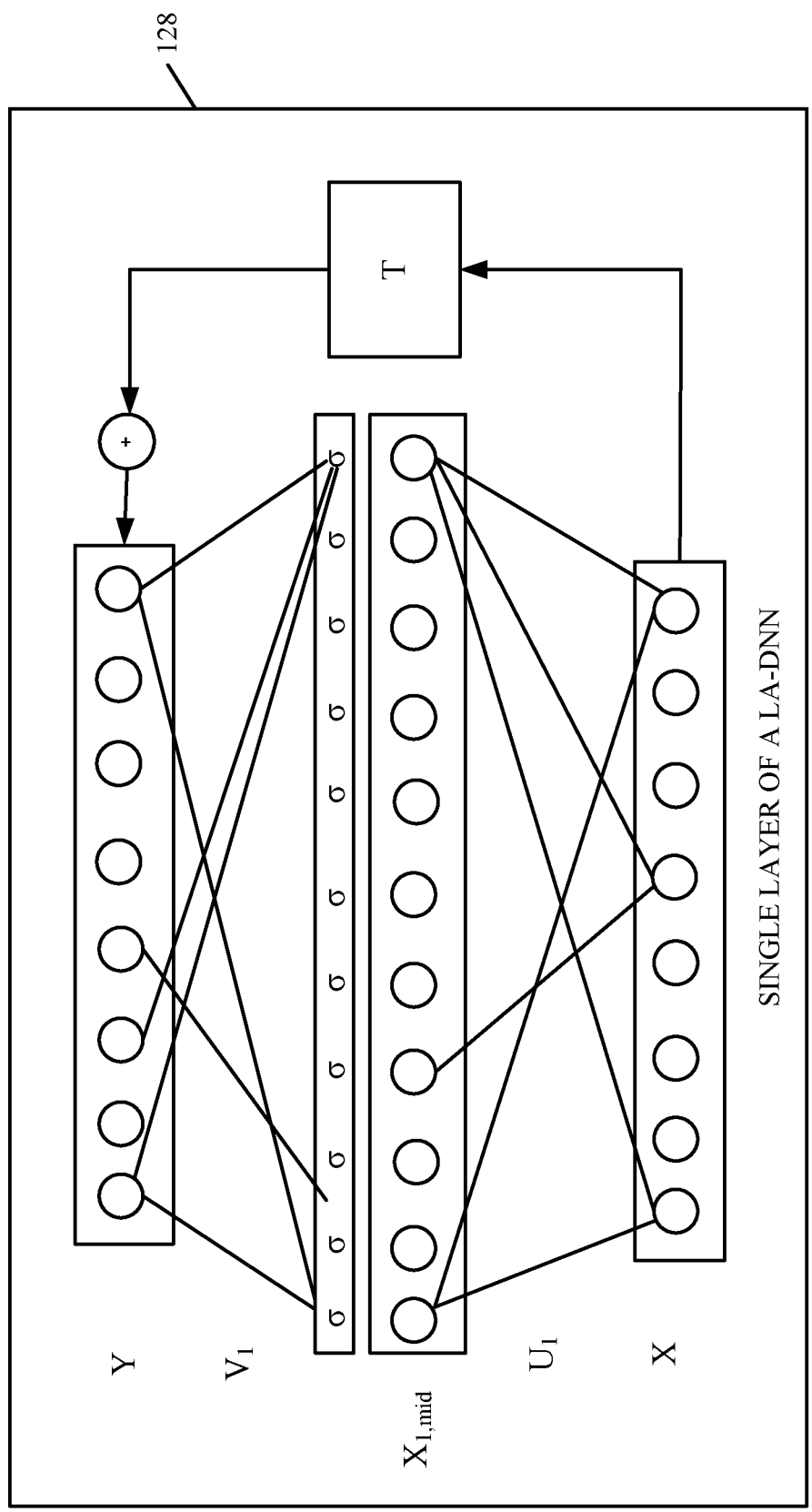
FIG. 2 is a block diagram illustrating the structure of a linear augmented deep neural network (LA-DNN).

FIG. 2 shows a graphic representation of a single layer 128 in LA-DNN model 122. Layer 128 shows the input vector X on the bottom of the layer which is transformed into a separate vector space $X_{1,mid}$ by the affine transformation portion of Equation 3. The non-linear function 6 is then applied to each of the values in the vector space $X_{1,mid}$, and the linear transformation V is also applied, to arrive at the output vector Y. The weight matrix T represents weight factors for the input features, which determine the portion of the linear and non-linear terms for each corresponding output feature.

Figure 3:
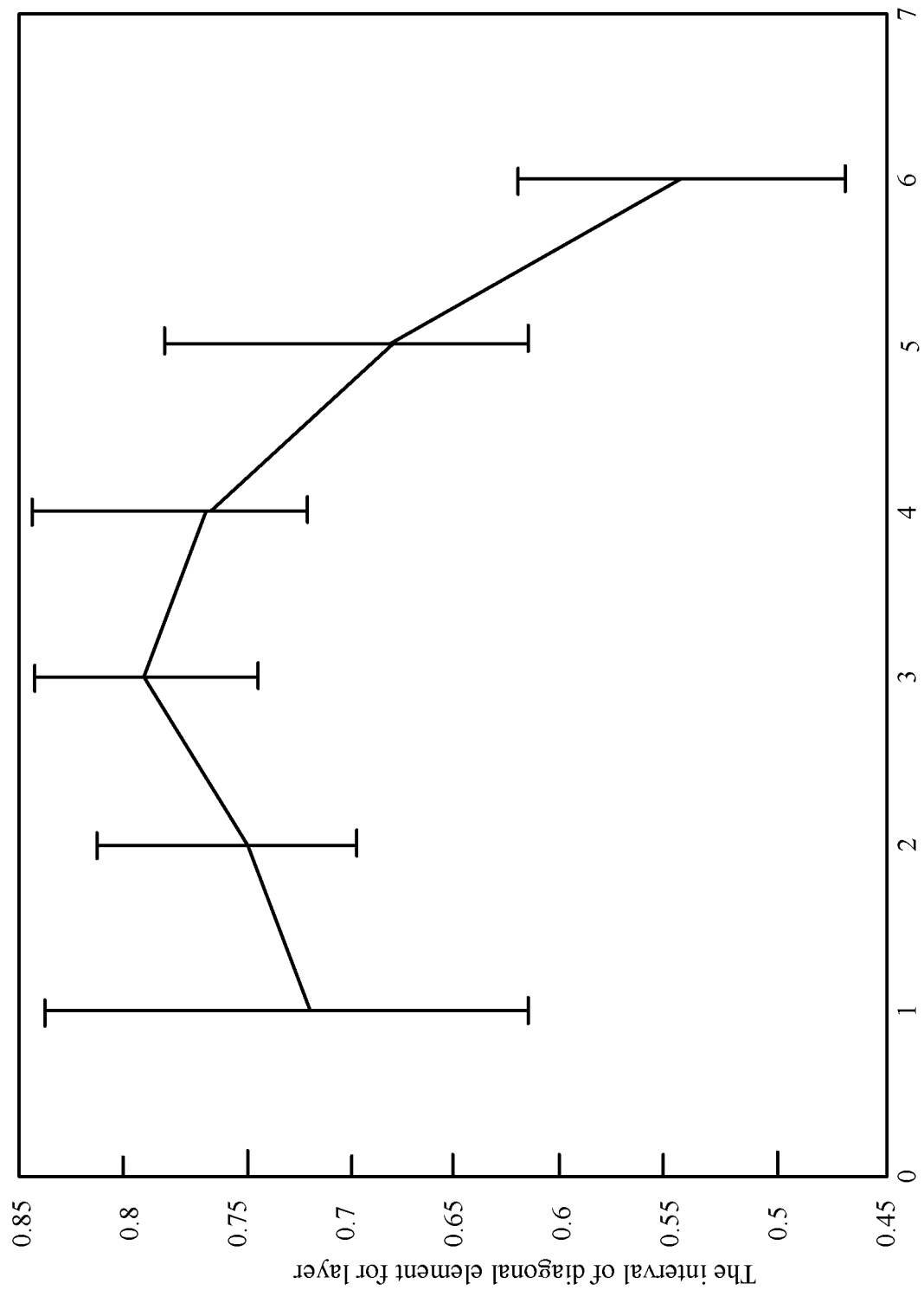
FIG. 3 illustrates one example of mean and variance values of a diagonal weight matrix representing the linear bypass connection for different layers in a trained model.

FIG. 3 is a graphical representation that plots the interval of a diagonal element for a given layer, against the layer number, for weight matrix $T_{in}$ a fully trained LA-DNN model 122. The average value of diagonal terms decreases for layers closer to the output layer y. This shows that these layers rely on the non-linear components and model more complex functions.

Figure 4:
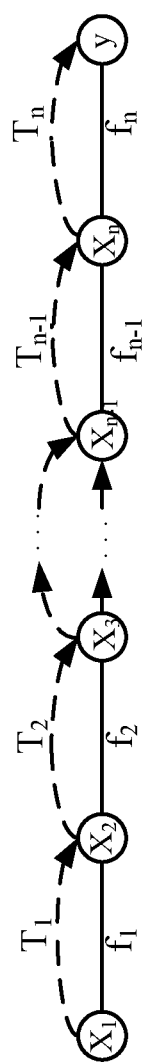
FIG. 4 illustrates multiple levels of a LA-DNN structure, as a composition of the different layers.

FIG. 4 shows that the LA-DNN model 122 can be interpreted as a combination of different layer-based classifiers, where the output layer as a final hypothesis is a weighted combination of these classifiers. The output y of the network can be written as follows:

$$y = c_0 x_1 + C_1 f_1(x_1) + \ldots + C_{n-1} f_{n-1}(x_{n-1}) + f_n(x_n) \qquad \text{Eq. 4}$$

where, $$C_i = \prod_{j=i+1}^{n} T_j \qquad \text{Eq. 5}$$

where $f_i$ is the function corresponding to layer i, and $x_i$ is the input feature vector for that layer.

Figure 5A:
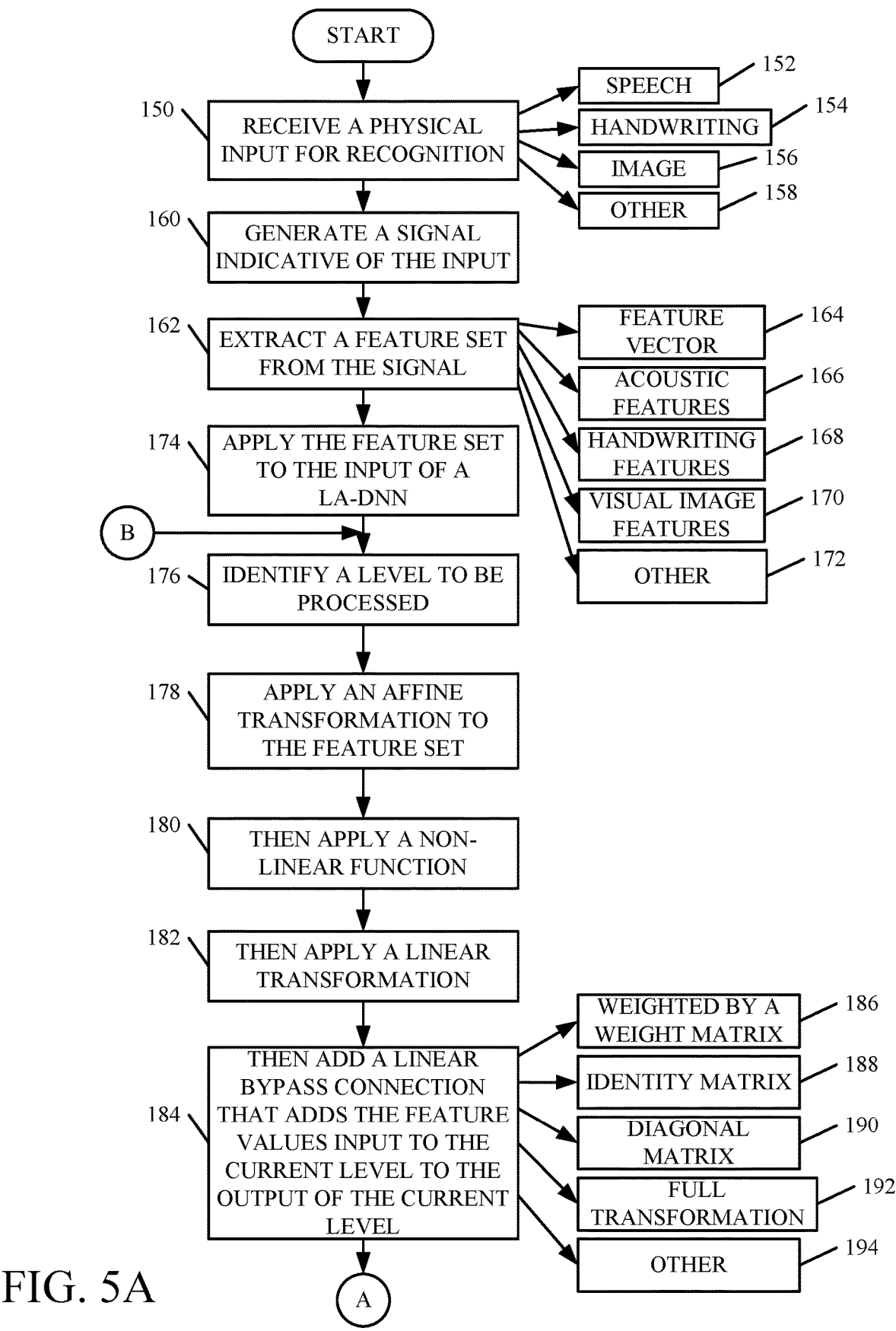
FIGS. 5A and 5B (collectively referred to as FIG. 5) show a flow diagram illustrating one example of the operation of the architecture shown in FIG. 1 in performing pattern recognition.
Figure 5B:
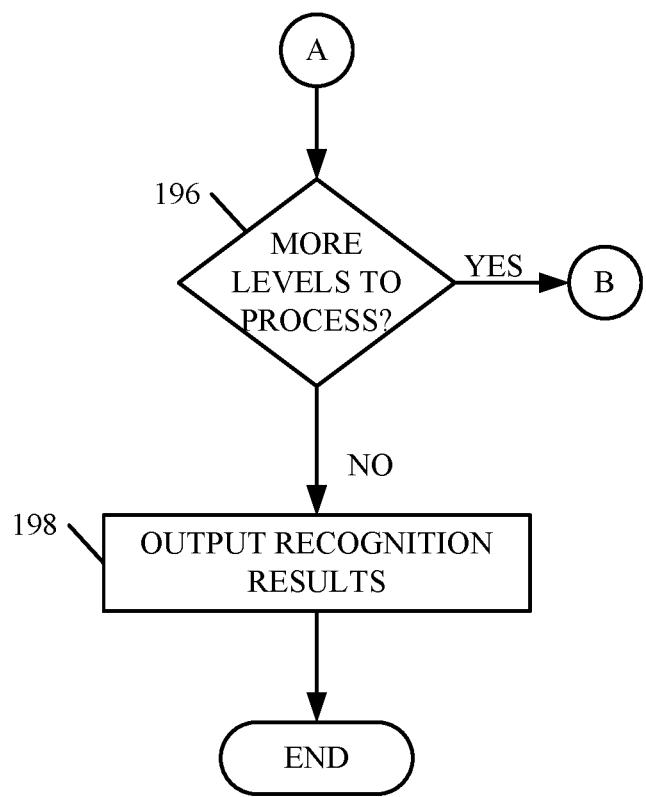

FIGS. 5A and 5B (collectively referred to herein as FIG. 5) illustrate a flow diagram showing one example of the operation of architecture 100 in applying a feature vector 120 to LA-DNN 122 to obtain a recognition result. A user interface mechanism 104 first receives a physical input for recognition. This is indicated by block 150. As mentioned above, the input can be a speech input 152, a handwriting input 154, an image 156, or a wide variety of other inputs 158.

User interface mechanism 104 then generates a signal indicative of the input, as indicated by block 160. Feature extractor logic 112 then extracts a feature set from the signal, as indicated by block 162. The feature set can be in the form of a feature vector 164. It can include, for instance, acoustic features 166, handwriting features 168, visual image features 170, or a wide variety of other features 172.

The feature set is then applied as an input to the input level of LA-DNN 122. This is indicated by block 174. For a given level that is being processed, the affine transformation is applied to the feature set at that level. This is indicated by blocks 176 and 178.

Next, the non-linear function is applied, as indicated by block 180, and the linear transformation V is applied next. This is indicated by block 182.

The linear bypass connection (that adds the feature values from the input for the current level, to the output of the current level) is then added. This is indicated by block 184. The linear bypass connection can be weighted by a weight matrix T, as indicated by block 186. The weight matrix T can be an identity matrix 188, a diagonal matrix 190, a full transformation matrix 192, or other matrices 194. In one example, the identity matrix has the fewest parameters, but also provides the least flexibility in modeling patterns. The full identity matrix is more flexible, but increases the parameter count. The diagonal matrix reflects a balance between the most flexibility but the most parameters offered by the full transformation matrix, and the least flexibility but the fewest parameters offered by the identity matrix.

Next, if there are more levels in the LA-DNN to be processed, then the output of the current level is provided as the input to the next level. This is indicated by block 196. When processing is completed, recognition results 126 are output by the LA-DNN 122. This is indicated by block 198.

As mentioned above, a significant difficulty in training very deep neural networks is the gradient vanishing problem. For a deep conventional DNN, the back-propagated error tends to vanish exponentially as it passes through the various layers in the DNN. The LA-DNN 122, on the other hand, handles the gradient vanishing problem without difficulty. If the objective function $\mathcal{L}$ is a function of y, then the gradient with respect to parameter $w_{ij}^k$ (which is $w_{ij}$ in layer k) is computed as follows:

$$\frac{\partial \mathcal{L}}{\partial w_{ij}^k} = \frac{\partial \mathcal{L}}{\partial y}\frac{\partial y}{\partial w_{ij}^k} = \frac{\partial \mathcal{L}}{\partial y}\sum_{l=k}^{n} C_l \frac{\partial f_l(x_l)}{\partial w_{ij}^k} + f_l \frac{\partial C_l}{\partial w_{ij}^k} \qquad \text{Eq. 6}$$

where, $$\frac{\partial f_l(x_l)}{\partial w_{ij}^k} = \frac{\partial f_l(x_l)}{\partial x_l}\prod_{m=k}^{l}\frac{\partial x_m}{\partial x_{m-1}} \qquad \text{Eq. 7}$$

Therefore, the gradient in LA-DNN model 122 is computed as follows:

$$\frac{\partial \mathcal{L}}{\partial w_{ij}^k} = C_k \frac{\partial \mathcal{L}}{\partial y}\frac{\partial f(x_k)}{\partial w_{ij}^k} + \ldots \qquad \text{Eq. 8}$$

Assuming the bypass connection has an identity or diagonal matrix ($C_k$ is a diagonal matrix with diagonal terms in range $c_{ij}^k$ is $0.8^{n-k}$ to 1.0), then the gradient $$\frac{\partial \mathcal{L}}{\mathcal{L}w_{ij}^k}$$

has an extra term which is not exponentially decreasing with layer depth k. This is in contrast to a conventional DNN, where the gradient decays exponentially as function of layer depth.

Figure 6:
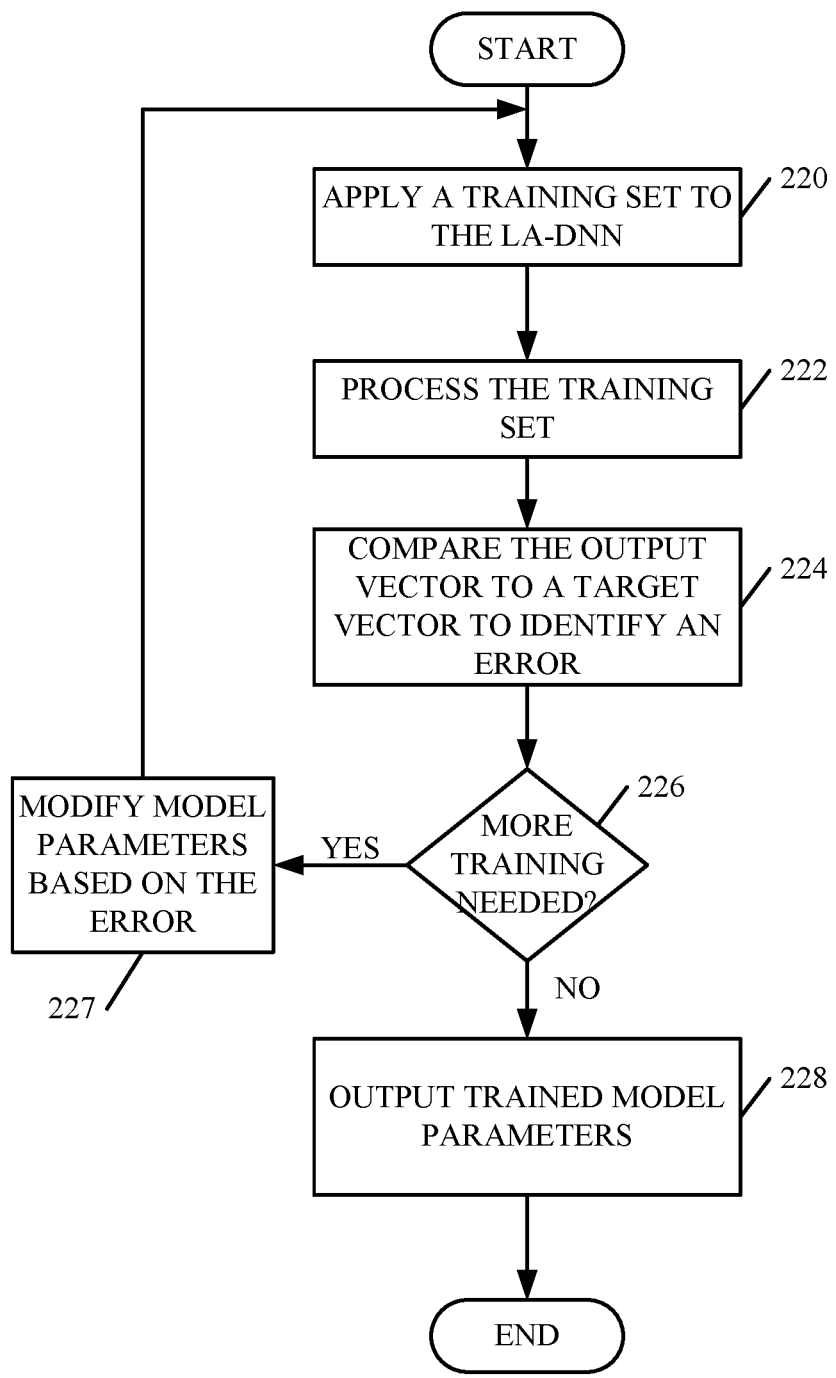
FIG. 6 is a flow diagram illustrating one example of the operation of a training system, in training a linearly augmented deep neural network.

FIG. 6 is a flow diagram illustrating one example of how to train an LA-DNN model 122. First, a training set of features is applied to the LA-DNN. This is indicated by block 220. That training set is applied to the input of the LA-DNN and processed through its various levels as described above with respect to FIG. 5. This is indicated by block 222. The output vector from LA-DNN model 122 is then compared to a target vector to identify an error. This is indicated by block 224. It is then determined whether there is any more training needed, or whether the LA-DNN 122 is sufficiently trained. This is indicated by block 226. If additional training is needed, then the model parameters are modified based on the error (as indicated by block 227) and processing reverts to block 220. However, if no further training is needed, then the trained model parameters are output for use in a runtime system. This is indicated by block 228.

It will also be noted that random initialization of conventional DNN parameters generates a high probability of falling into the basin of attraction of poor local minima. Initializing the network using unsupervised pre-training helps conventional DNNs to be in a basin of attraction to better local minima, which results in a better generalization model. However, the LA-DNN model 122 can be viewed as a pre-trained model where the model initializes the parameters in a region of parameter space with a better local optimum of the training criterion. The LA-DNN 122 has higher learning capacity and requires fewer parameters compared to a conventional DNN. The training and validation cross-entropy for the LA-DNN model 122 is much better than conventional DNN models, after a relatively low number of training iterations. Since the LA-DNN 122 is much closer to the basin of attraction of a local optimum than the DNN, after a relatively low number of iterations, the initial learning rate of the LA-DNN 122 is smaller as well.

Because the LA-DNN 122 converges quickly (much faster than a baseline DNN), this can lead to over-training. This can be addressed by automatically reducing the learning rate by a constant factor, if, after an epoch, the cross-entropy on the validation set has degraded. In addition, small changes in the parameters can be enforced using gradient clipping, which controls gradient explosion and employs a regularization, which can be added be learning algorithms to minimize the loss function by instead minimizing the loss function plus the model's weight vector multiplied by either the L1 norm or the squared L2 norm (the latter being generally referred to as L2 regularization).

Figure 7:
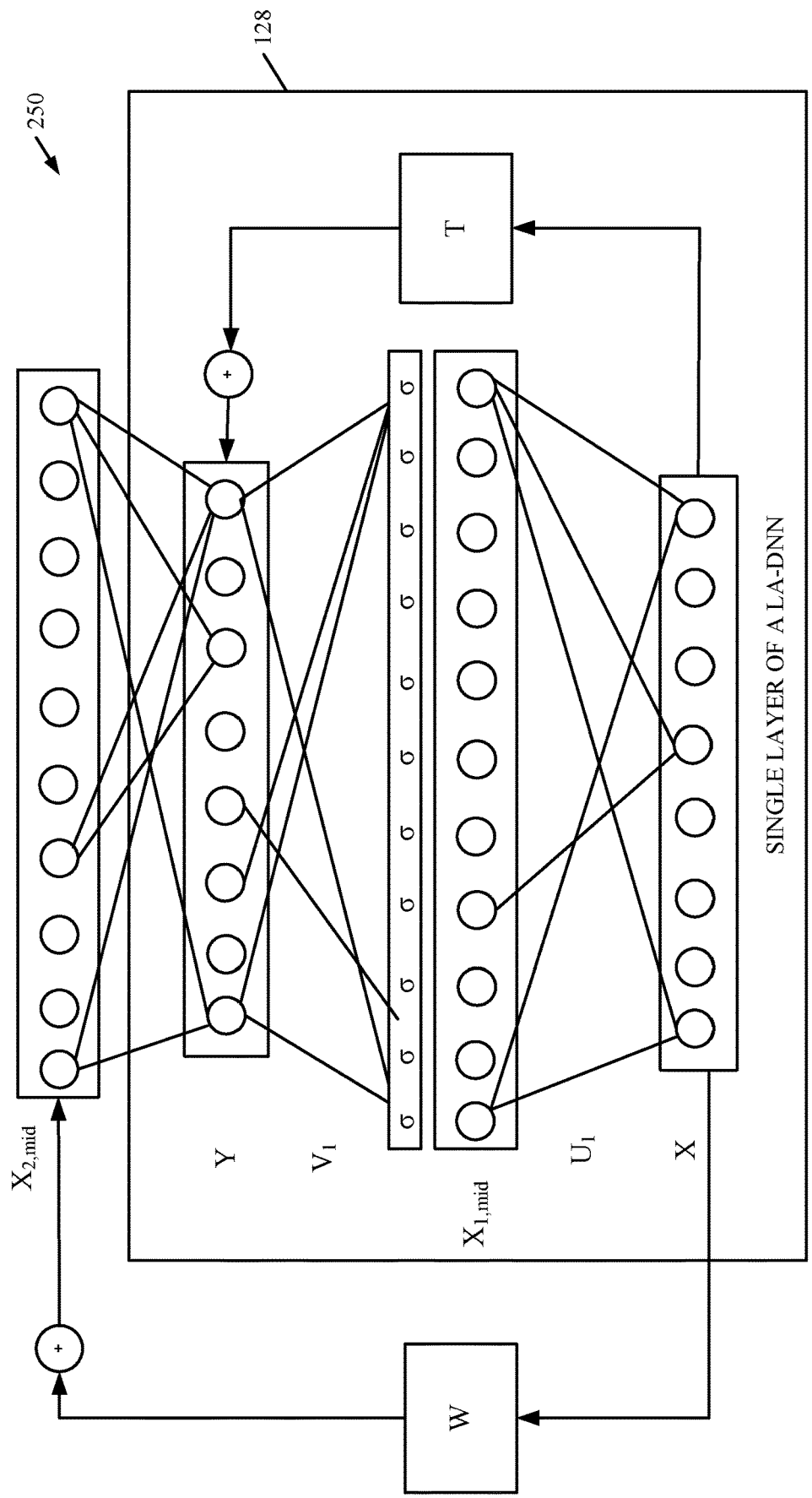
FIG. 7 is a block diagram of one example of an extended LA-DNN, also referred to as a spliced DNN (or S-DNN).

FIG. 7 is similar to FIG. 2, and similar items are similarly numbered. FIG. 7, however models a single layer of a spliced DNN. The spliced DNN structure 250 is an extended form of the LA-DNN model 122 shown in FIG. 2. In the LA-DNN model, $X_{2,mid}$ is modeled as:

$$x_{2,mid}=U_2(V_1\sigma(U_1x+b)+Tx) \qquad \text{Eq. 9}$$

A tied transformation $U_2$ is used to model middle layer $X_{2,mid}$ as a summation of linear part $U_1T_x$ and non-linear part $U_2(V_1\sigma(U_1x+b))$. The spliced DNN uses an untied transformation to continue the linear and non-linear parts of the model, and to model $X_{2,mid}$ as follows:

$$x_{2,mid}=U_2(V_1\sigma(U_1x+b))+Wx \qquad \text{Eq. 10}$$

where W is a full matrix. This type of network is referred to as a spliced DNN (S-DNN), because it splices the input of each layer x to the input of the next layer f(x), and the output y is modeled as follows:

$$y = [U_2 \ W] \begin{bmatrix} f(x) \\ x \end{bmatrix} \qquad \text{Eq. 11}$$

In the S-DNN, any information which may be lost from the input space in each layer is directly transferred to the output space using a linear transformation. It will be noted that the S-DNN model uses a full transformation matrix as the bypass connection in each layer and thus increases the number of parameters in the model, compared to the LA-DNN structure 122 shown in FIG. 2.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 8:
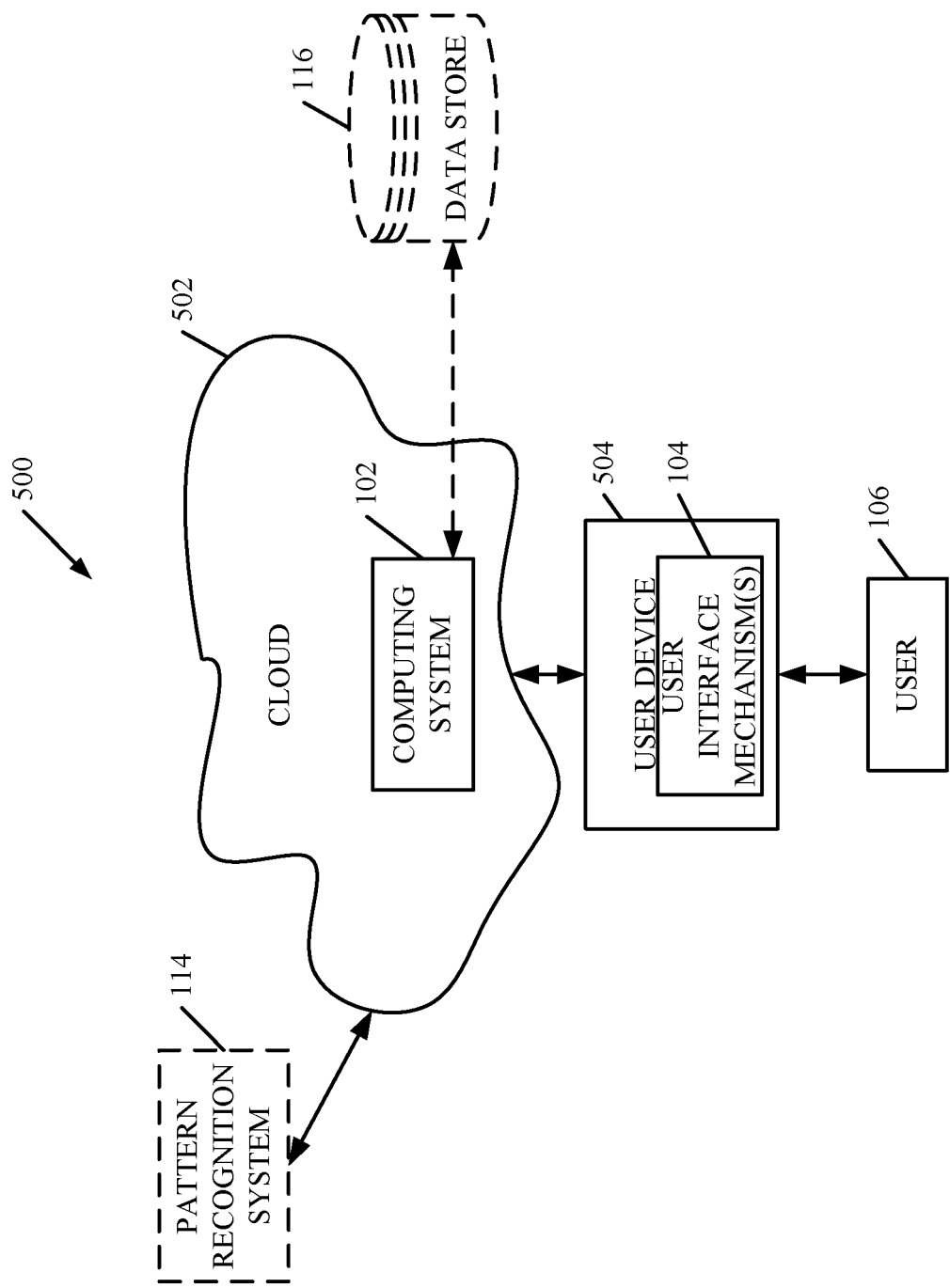
FIG. 8 is a block diagram of one example of the architecture shown in FIG. 1, deployed in a cloud computing architecture.

FIG. 8 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 8, some items are similar to those shown in FIG. 1 and they are similarly numbered. FIG. 8 specifically shows that computing system 102 is located in cloud 502 (which can be public, private, or a combination where portions are public while others are private). Therefore, user 106 uses a user device 504 to access those systems through cloud 502.

FIG. 8 also depicts another example of a cloud architecture. FIG. 8 shows that it is also contemplated that some elements of computing system 102 are disposed in cloud 502 while others are not. By way of example, data store 116 can be disposed outside of cloud 502, and accessed through cloud 502. In another example, pattern recognition system 114 is also outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
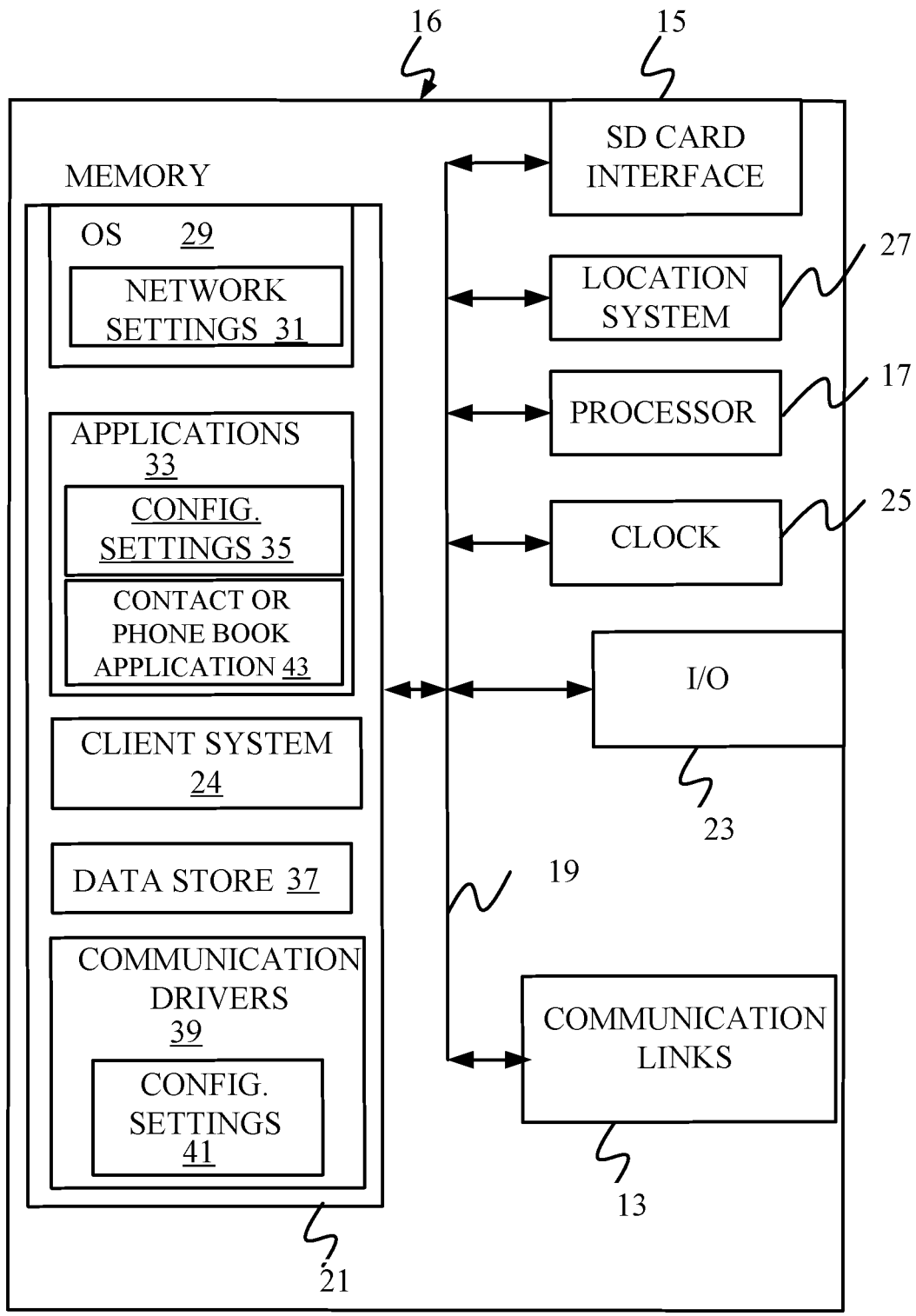
FIGS. 9-11 show examples of mobile devices that can be used in the architectures shown in the previous figures.
Figure 10:
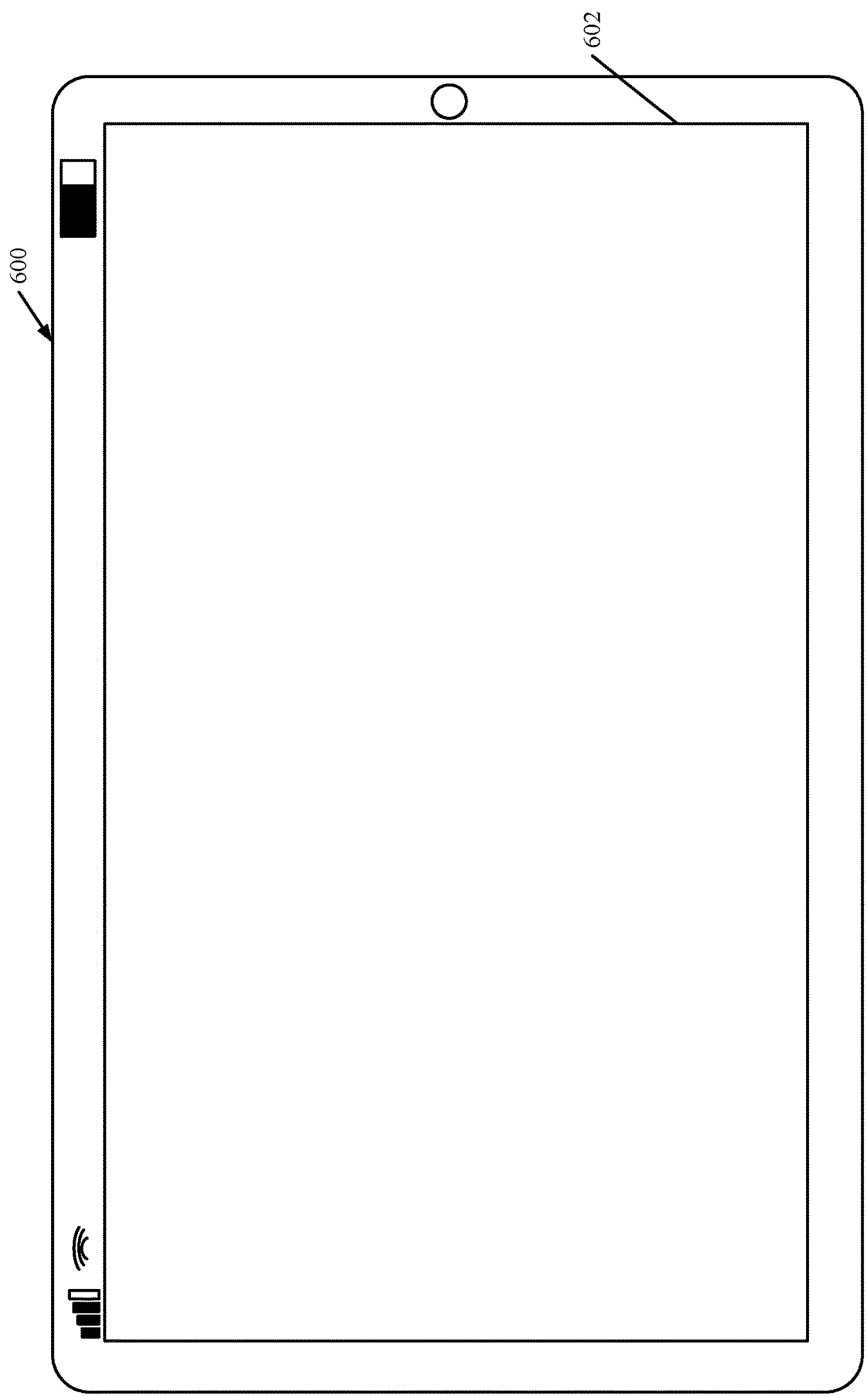
Figure 11:
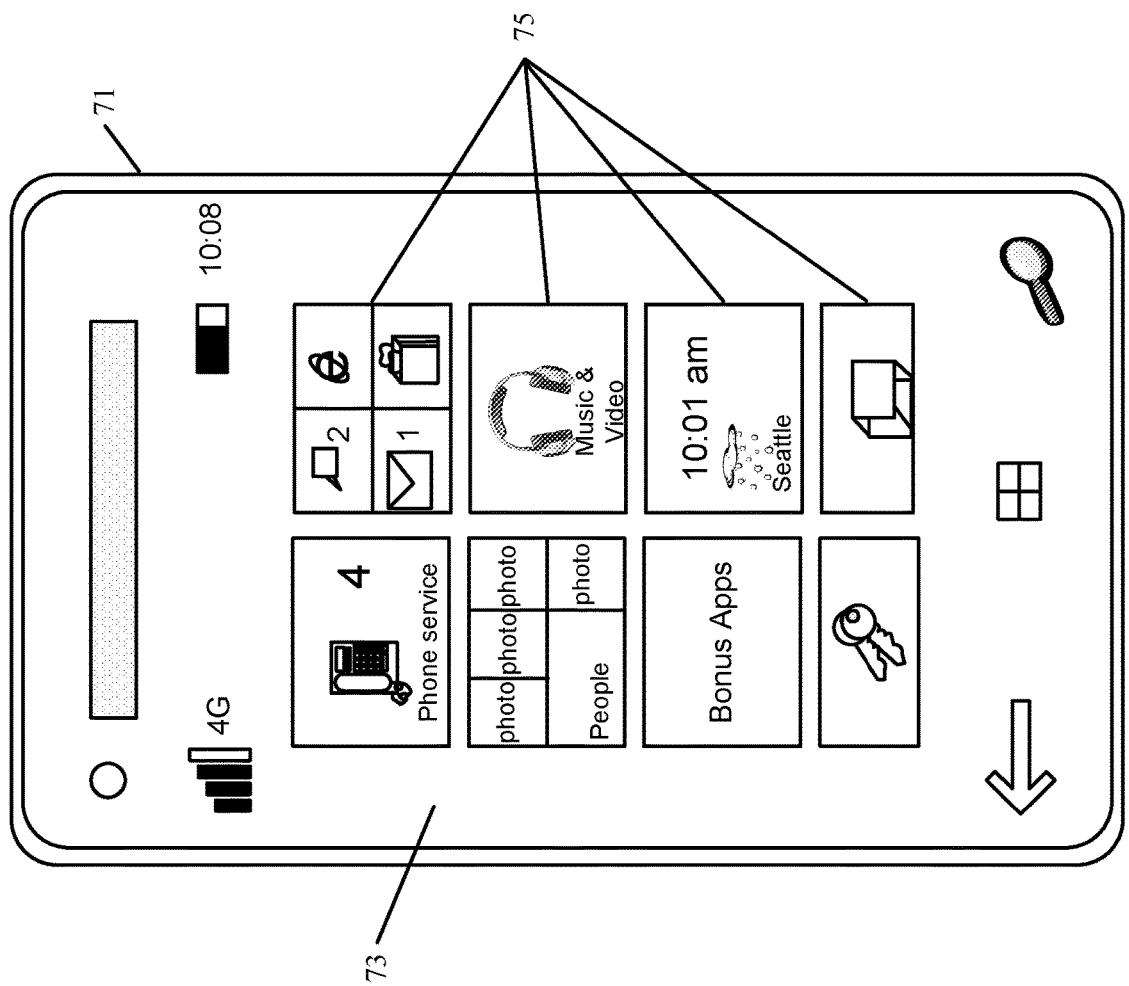

FIG. 9 is a simplified block diagram of one illustrative example of a handheld or mobile computing device that can be used as a user's or client's hand held device 16, in which the present system (or parts of it) can be deployed. FIGS. 10-11 are examples of handheld or mobile devices.

FIG. 9 provides a general block diagram of the components of a client device 16 that can run components of computing system 102 or that interacts with architecture 100

(such as by providing the input), or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers 110 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 10 shows one example in which device 16 is a tablet computer 600. In FIG. 10, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
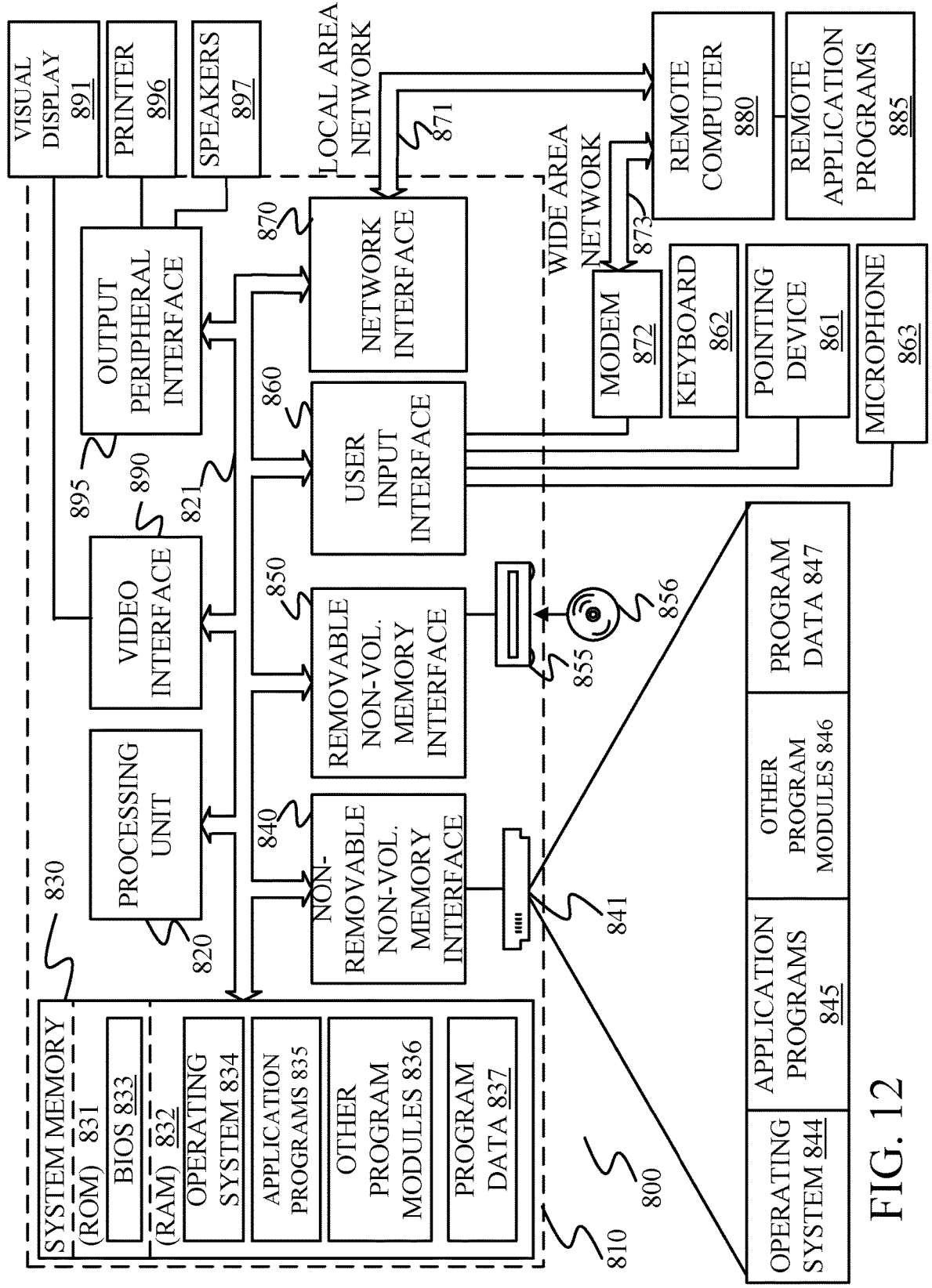
FIG. 12 is a block diagram of one example of a computing environment that can be used in the architectures shown in the previous figures.

FIG. 12 is one example of a computing environment in which architecture 100, or parts of it, (for example) can be deployed. With reference to FIG. 12, an example system for implementing some embodiments includes a general-purpose computing device in the form of a computer 810. Components of computer 810 may include, but are not limited to, a processing unit 820 (which can comprise processors or servers 110 or those in other devices described herein), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820.

By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
feature extraction logic that receives an input signal indicative of a physical input and extracts a set of features from the input signal; and
a neural network pattern recognizer, comprising:
an input level of nodes that receives the set of features and applies a first non-linear function to the set of features to output a first set of modified values;
a first linear bypass connection connecting the set of features received by the input level of nodes to the first set of modified values output by the input level of nodes, with a linear function, to obtain a first set of output values;
a first intermediate level of nodes that receives, as a first set of intermediate input values, the first set of output values and applies a first intermediate non-linear function to the first set of intermediate input values to obtain a first set of intermediate modified values;
a first intermediate linear bypass connection connecting the set of intermediate input values received by the first intermediate level of nodes to the first set of intermediate modified values output by the first intermediate level of nodes, with a linear function, to obtain a first set of intermediate output values; and
an output level of nodes that receives the first set of intermediate output values, and generates a set of output values, the output values being indicative of a pattern represented by the physical input.

Example 2 is the computing system of any or all previous examples wherein the neural network pattern recognizer comprises:
a plurality of additional intermediate levels of nodes, each intermediate level of nodes receiving, as a given set of intermediate input values, a given set of output values from a previous intermediate level of nodes, and applying a given intermediate non-linear function to the given set of intermediate input values to obtain a given set of intermediate modified values.

Example 3 is the computing system of any or all previous examples wherein the neural network pattern recognizer comprises:
a plurality of additional intermediate linear bypass connections, each connecting the given set of intermediate input values received by a corresponding one of the plurality of additional intermediate levels of nodes to the given set of intermediate modified values output by the corresponding one additional intermediate level of nodes, with a linear function, to obtain a given set of intermediate output values for the corresponding one additional intermediate level of nodes.

Example 4 is the computing system of any or all previous examples wherein the first intermediate level of nodes generates the first set of intermediate modified values by applying an affine function to the first set of intermediate input values after the first intermediate non-linear function is applied.

Example 5 is the computing system of any or all previous examples wherein the first linear bypass connection and the first intermediate linear by pass connection are both configured to apply a corresponding matrix transformation to obtain the first set of output values and the first set of intermediate output values, respectively.

Example 6 is the computing system of any or all previous examples wherein the first linear bypass connection and the first intermediate linear by pass connection are both configured to apply a different corresponding matrix transformation.

Example 7 is the computing system of any or all previous examples wherein the corresponding matrix transformation for at least one of the first linear bypass connection and the first intermediate linear by pass connection comprises a full matrix transformation.

Example 8 is the computing system of any or all previous examples wherein the corresponding matrix transformation for at least one of the first linear bypass connection and the first intermediate linear by pass connection comprises an identity matrix transformation.

Example 9 is the computing system of any or all previous examples wherein the corresponding matrix transformation for at least one of the first linear bypass connection and the first intermediate linear by pass connection comprises a diagonal matrix transformation.

Example 10 is the computing system of any or all previous examples wherein the input signal comprises a speech signal indicative of a speech input and wherein the feature extraction logic is configured to extract an acoustic feature vector of acoustic features from the speech signal.

Example 11 is the computing system of any or all previous examples wherein the input signal comprises an image signal indicative of an image input representing a captured image and wherein the feature extraction logic is configured to extract an image feature vector of image features from the image signal.

Example 12 is the computing system of any or all previous examples wherein the input signal comprises a handwriting recognition signal indicative of a handwriting input and wherein the feature extraction logic is configured to extract a handwriting feature vector of character recognition features from the handwriting recognition signal.

Example 13 is a computer implemented method, comprising:
receiving an input signal indicative of a physical input;
extracting a set of features from the input signal;
applying the set of features to an input level of nodes in a pattern recognizer, the input level of nodes applying a first non-linear function to the set of features to output a first set of modified values;
connecting the set of features received by the input level of nodes to the first set of modified values output by the input level of nodes, with a first linear bypass connection, to obtain a first set of output values;
receiving, as a first set of intermediate input values at a first intermediate level of nodes, the first set of output values;
applying, at the first intermediate level of nodes, a first intermediate non-linear function to the first set of intermediate input values to obtain a first set of intermediate modified values;
connecting the set of intermediate input values received by the first intermediate level of nodes to the first set of intermediate modified values output by the first intermediate level of nodes, with a first intermediate linear bypass connection, to obtain a first set of intermediate output values; and
generating a set of output values based on the first set of intermediate output values, the output values being indicative of a pattern represented by the physical input.

Example 14 is the computer implemented method of any or all previous examples wherein generating a set of output values comprises:

successively receiving, at a plurality of additional intermediate levels of nodes, as a corresponding set of intermediate input values, a set of output values from a previous intermediate level of nodes;

at each of the plurality of additional intermediate levels of nodes, applying a corresponding intermediate non-linear function to the corresponding set of intermediate input values to obtain a corresponding set of intermediate modified values; and at each of the plurality of additional intermediate levels of nodes, connecting the corresponding set of intermediate input values to the corresponding set of intermediate modified values, with a corresponding one of a plurality of additional intermediate linear bypass connections, to obtain a corresponding set of intermediate output values.

Example 15 is the computer implemented method of any or all previous examples wherein connecting the set of features received by the input level of nodes to the first set of modified values output by the input level of nodes and connecting the set of intermediate input values received by the first intermediate level of nodes to the first set of intermediate modified values output by the first intermediate level of nodes, both comprise:

applying a corresponding matrix transformation to obtain the first set of output values and the first set of intermediate output values, respectively.

Example 16 is the computer implemented method of any or all previous examples wherein the corresponding matrix transformation for connecting at least one of the set of features received by the input level of nodes to the first set of modified values output by the input level of nodes and the set of intermediate input values received by the first intermediate level of nodes to the first set of intermediate modified values output by the first intermediate level of nodes comprises at least one of: a full matrix transformation, an identity matrix transformation, and a diagonal matrix transformation.

Example 17 is the computer implemented method of any or all previous examples wherein the input signal comprises a speech signal indicative of a speech input and wherein extracting a set of features comprises:

extracting an acoustic feature vector of acoustic features from the speech signal.

Example 18 is the computer implemented method of any or all previous examples wherein the input signal comprises an image signal indicative of an image input representing a captured image and wherein extracting a set of features comprises extracting an image feature vector of image features from the image signal.

Example 19 is a computing system, comprising:

a user interface component configured to detect a user input and generate an input signal indicative of the user input;

feature extraction logic configured to receive the input signal and extract a set of features from the input signal; and an artificial neural network, comprising:

an input level of nodes that receives the set of features and applies a first non-linear function to the set of features to output a first set of modified values;

a first linear bypass connection connecting the set of features received by the input level of nodes to the first set of modified values output by the input level of nodes, with a linear function, to obtain a first set of output values;

a first intermediate level of nodes that receives, as a first set of intermediate input values, the first set of output values and applies a first intermediate non-linear function to the first set of intermediate input values to obtain a first set of intermediate modified values;

a first intermediate linear bypass connection connecting the set of intermediate input values received by the first intermediate level of nodes to the first set of intermediate modified values output by the first intermediate level of nodes, with a linear function, to obtain a first set of intermediate output values; and an output level of nodes that receives the first set of intermediate output values, and generates a set of output values, the output values being indicative of a pattern represented by the physical input.

Example 20 is the computing system of any or all previous examples wherein the artificial neural network further comprises:

a plurality of additional intermediate levels of nodes, each intermediate level of nodes receiving, as a given set of intermediate input values, a given set of output values from a previous intermediate level of nodes, and applying a given intermediate non-linear function to the given set of intermediate input values to obtain a given set of intermediate modified values; and a plurality of additional intermediate linear bypass connections, each connecting the given set of intermediate input values received by a corresponding one of the plurality of additional intermediate levels of nodes to the given set of intermediate modified values output by the corresponding one additional intermediate level of nodes, with a linear function, to obtain a given set of intermediate output values for the corresponding one additional intermediate level of nodes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:

feature extraction logic that receives an input signal indicative of a physical input and extracts a set of features from the input signal; and a neural network pattern recognizer, comprising:

an input level of nodes that receives the set of features and applies a first non-linear function to the set of features to output a first set of modified values;

a first linear bypass connection connecting the set of features received by the input level of nodes to the first set of modified values output by the input level of nodes, with a linear function, to obtain a first set of output values, the first linear bypass connection comprising a first weight matrix transformation configured to apply a set of weight factors to the set of features to obtain the first set of output values, wherein each weight factor in the first weight matrix transformation corresponds to one of the output values and defines portions of linear and non-linear terms, from the set of features, for the corresponding output value;

a first intermediate level of nodes that receives, as a first set of intermediate input values, the first set of output values and applies a first intermediate non-linear function to the first set of intermediate input values to obtain, a first set of intermediate modified values;

a first intermediate linear bypass connection connecting the set of intermediate input values received by the first intermediate level of nodes to the first set of intermediate modified values output by the first intermediate level of nodes, with a linear function, to obtain a first set of intermediate output values, the first intermediate linear bypass connection comprising a second weight matrix transformation configured to apply a set of weight factors to the set of intermediate input values to obtain the first set of intermediate output values, wherein each weight factor in the second weight matrix transformation corresponds to one of the intermediate output values and defines portions of linear and non-linear terms, from the set of intermediate input values, for the corresponding intermediate output value; and an output level of nodes that receives the first set of intermediate output values, and generates a set of output values, the output values being indicative of a pattern represented by the physical input.

2. The computing system of claim 1 wherein the neural network pattern recognizes comprises:

a plurality of additional intermediate levels of nodes, each intermediate level of nodes receiving, as a given set of intermediate input values, a given set of output values from a previous intermediate level of nodes, and applying a given intermediate non-linear function to the given set of intermediate input values to obtain a given set of intermediate modified values.

3. The computing system of claim 2 wherein the neural network pattern recognizer comprises:

a plurality of additional intermediate linear bypass connections, each connecting the given set of intermediate input values received by a corresponding one of the plurality of additional intermediate levels of nodes to the given set of intermediate modified values output by the corresponding one additional intermediate level of nodes, with a linear function, to obtain a given set of intermediate output values for the corresponding one additional intermediate level of nodes.

4. The computing system of claim 1 wherein the first intermediate level of nodes generates the first set of intermediate modified values by applying an affine function to the first set of intermediate input values after the first intermediate non-linear function is applied.

5. The computing system of claim 4 wherein the first linear bypass connection and the first intermediate linear bypass connection are both configured to apply a different corresponding; matrix transformation.

6. The computing system of claim 4 wherein the corresponding matrix transformation for at least one of the first linear bypass connection and the first intermediate linear bypass connection comprises a full matrix transformation.

7. The computing system of claim 4 wherein the corresponding matrix transformation for at least one of the first linear bypass connection and the first intermediate linear bypass connection comprises an identity matrix transformation.

8. The computing system of claim 4 wherein the corresponding matrix transformation for at least one of the first linear bypass connection and the first intermediate linear bypass connection comprises a diagonal matrix transformation.

9. The computing system of claim 1 wherein the input signal comprises a speech signal indicative of a speech input and wherein the feature extraction logic is configured to extract an acoustic feature vector of acoustic features from the speech signal.

10. The computing system of claim 1 wherein the input signal comprises an image signal indicative of an image input representing a captured image and wherein the feature extraction logic is configured to extract an image feature vector of image features from the image signal.

11. The computing system of claim 1 wherein the input signal comprises a handwriting recognition signal indicative of a handwriting input and wherein the feature extraction logic is configured to extract a handwriting feature vector of character recognition features from the handwriting recognition signal.

12. A computer implemented method, comprising:

receiving an input signal indicative of a physical input;

extracting a set of features from the input signal;

applying the set of features to an input level of nodes in a pattern recognizer, the input level of nodes applying a first non-linear function to the set of features to output a first set of modified values;

connecting the set of features received by the input level of nodes to the first set of modified values output by the input level of nodes, with a first linear bypass connection configured to apply a first matrix transformation, to obtain a first set of output values, wherein the first matrix transformation is configured to apply set of weight factors to the set of features to obtain the first set of output values, wherein each weight factor corresponds to one of the output values and defines portions of linear and non-linear terms, from the set of features, for the corresponding output value;

receiving, as a first set of intermediate input values at a first intermediate level of nodes, the first set of output values;

applying, at the first intermediate level of nodes, a first intermediate non-linear function to the first set of intermediate input values to obtain a first set of intermediate modified values;

connecting the first set of intermediate input values received by the first intermediate level of nodes to the first set of intermediate modified values output by the first intermediate level of nodes, with a first intermediate linear bypass connection configured to apply a second matrix transformation, that is different than the first matrix transformation, to obtain a first set of intermediate output values; and generating a set of output values based on the first set of intermediate output values, the output values being indicative of a pattern represented by the physical input.

13. The computer implemented method of claim 12 wherein generating a set of output values comprises:

successively receiving, at a plurality of additional intermediate levels of nodes, as a corresponding set of intermediate input values, a set of output values from a previous intermediate level of nodes;

at each of the plurality of additional intermediate levels of nodes, applying a corresponding intermediate non-linear function to the corresponding set of intermediate input values to obtain a corresponding set of intermediate modified values; and at each of the plurality of additional intermediate levels of nodes, connecting the corresponding set of intermediate input values to the corresponding set of intermediate modified values, with a corresponding one of a plurality of additional intermediate linear bypass connections, to obtain a corresponding set of intermediate output values.

14. The computer implemented method of claim 12 wherein the corresponding matrix transformation for connecting at least one of the set of features received by the input level of nodes to the first set of modified values output by the input level of nodes and the first set of intermediate input values received by the first intermediate level of nodes to the first set of intermediate modified values output by the first intermediate level of nodes comprises at least one of: a full matrix transformation, an identity matrix transformation, and a diagonal matrix transformation.

15. The computer implemented method of claim 12 wherein the input signal comprises a speech signal indicative of a speech input and Wherein extracting a set of features comprises:
   extracting an acoustic feature vector of acoustic features from the speech signal.

16. The computer implemented method of claim 12 wherein the input signal comprises an image signal indicative of an image input representing a captured image and wherein extracting a set of features comprises
   extracting an image feature vector of image features from the image signal.

17. A computing system, comprising:
   a user interface component configured to detect a user input and generate an input signal indicative of the user input;
   feature extraction logic configured to receive the input signal and extract a set of features from the input signal; and
   an artificial neural network, comprising:
      an input level of nodes that receives the set of features and applies a first non-linear function to the set of features to output a first set of modified values;
      a first linear bypass connection connecting the set of features received by the input level of nodes to the first set of modified values output by the input level of nodes, the first linear bypass connection being configured to apply a first matrix transformation to obtain a first set of output values, wherein
      the first matrix transformation is configured to apply a set of weight factors to the set of features to obtain the first set of output values, wherein each weight factor corresponds to one of the output values and defines portions of linear and non-linear terms, from the set of features, for the corresponding output value;
      a first intermediate level of nodes that receives, as a first set of intermediate input values, the first set of output values and applies a first intermediate non-linear function to the first set of intermediate input values to obtain a first set of intermediate modified values;
      a first intermediate linear bypass connection connecting the set of intermediate input values received by the first intermediate level of nodes to the first set of intermediate modified values output by the first intermediate level of nodes, the first intermediate linear bypass connection being configured to apply a second matrix transformation to obtain a first set of intermediate output values; and
      an output level of nodes that receives the first set of intermediate output values, and generates a set of output values, the output values being indicative of a pattern represented by the user input.

18. The computing system of claim 17 wherein the artificial neural network further comprises:
   a plurality of additional intermediate levels of nodes, each intermediate level of nodes receiving, as a given set of intermediate input values, a given set of output values from a previous intermediate level of nodes, and applying a given intermediate non-linear function to the given set of intermediate input values to obtain a given set of intermediate modified values; and
   a plurality of additional intermediate linear bypass connections, each connecting the given set of intermediate input values received by a corresponding one of the plurality of additional intermediate levels of nodes to the given set of intermediate modified values output by the corresponding one additional intermediate level of nodes, with a linear function, to obtain a given set of intermediate output values for the corresponding one additional intermediate level of nodes.

* * * * *